(12) United States Patent
Maguire et al.

(10) Patent No.: US 7,415,905 B2
(45) Date of Patent: Aug. 26, 2008

(54) VEHICULAR TRANSMISSIONS UTILIZING SLIPPER RING CLUTCH CONTROL

(75) Inventors: Joel M. Maguire, Northville, MI (US); Scott H. Wittkopp, Ypsilanti, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 232 days.

(21) Appl. No.: 11/302,676

(22) Filed: Dec. 14, 2005

(65) Prior Publication Data

US 2006/0150760 A1      Jul. 13, 2006

Related U.S. Application Data

(60) Provisional application No. 60/642,390, filed on Jan. 7, 2005.

(51) Int. Cl.
*F16H 3/38*   (2006.01)
*F16D 43/25*  (2006.01)

(52) U.S. Cl. .................................. 74/339; 192/82 T
(58) Field of Classification Search .............. 74/339, 74/331; 192/77, 78, 82 T
See application file for complete search history.

(56) References Cited

U.S. PATENT DOCUMENTS

| | | | | |
|---|---|---|---|---|
| 4,093,049 A | * | 6/1978 | Watson et al. ................. | 192/47 |
| 4,817,451 A | * | 4/1989 | Weismann .................... | 74/333 |
| 5,131,285 A | * | 7/1992 | Weismann et al. ............ | 74/333 |
| 5,178,250 A | * | 1/1993 | Ashikawa et al. ............. | 192/38 |
| 6,409,001 B1 |  | 6/2002 | Kerr ............................ | 192/44 |
| 6,446,776 B1 |  | 9/2002 | Kerr ............................ | 192/44 |
| 6,619,151 B2 | * | 9/2003 | Shioiri ......................... | 74/333 |
| 7,004,875 B2 | * | 2/2006 | Williams et al. ............. | 475/198 |

* cited by examiner

*Primary Examiner*—Dirk Wright

(57) ABSTRACT

Provided are various vehicular transmission combinations utilizing selectively engageable spiral-type couplings or slipper ring clutches, operable to provide smooth shifting between gear sets, in place of traditional shifting mechanisms, such as hydraulic plate-type clutches, or synchronizers.

7 Claims, 7 Drawing Sheets

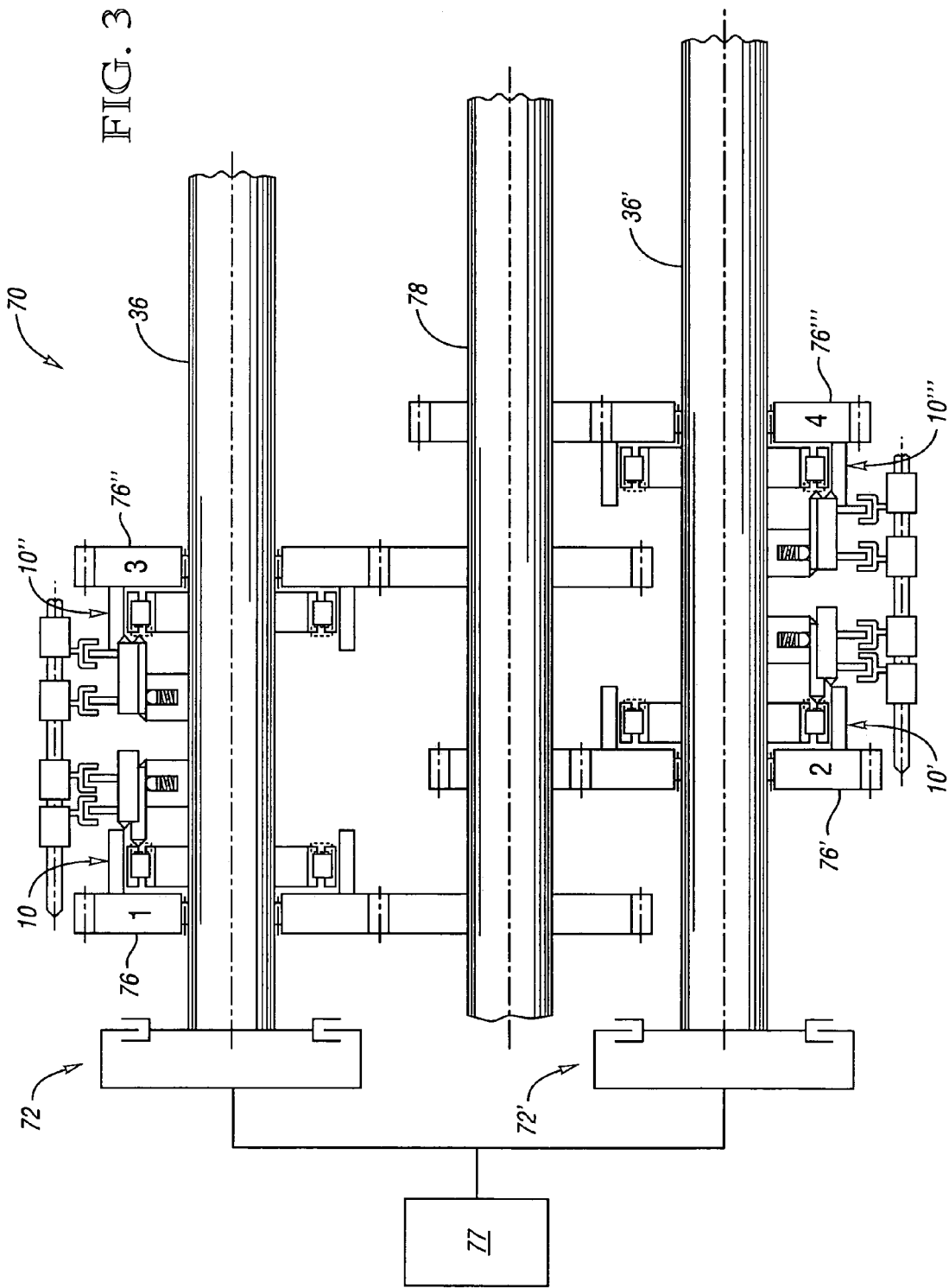

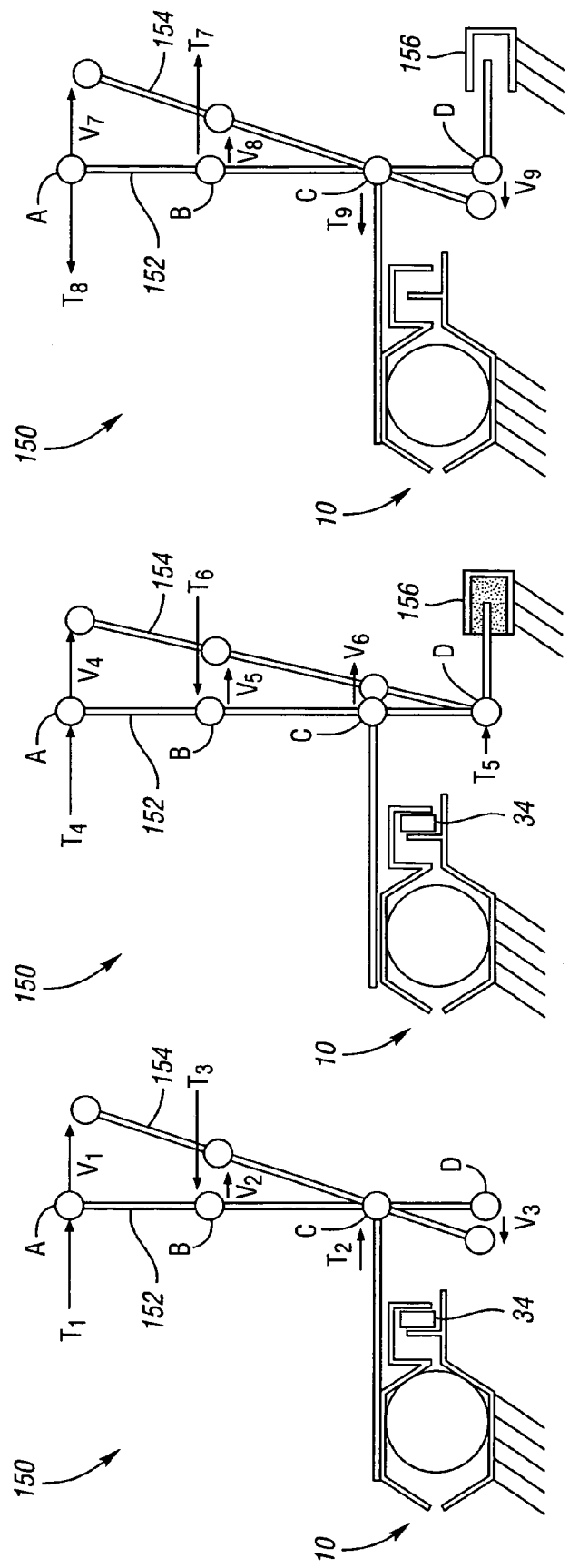

VEHICULAR TRANSMISSIONS UTILIZING SLIPPER RING CLUTCH CONTROL

CROSS REFERENCE TO RELATED APPLICATION

This application claims the benefit of U.S. Provisional Application No. 60/642,390, filed Jan. 7, 2005, which is hereby incorporated by reference in its entirety.

TECHNICAL FIELD

The present invention relates to vehicular transmissions and, more particularly, to the use of slipper ring clutch mechanisms to control various types of vehicular transmissions.

BACKGROUND OF THE INVENTION

Automobiles require shiftable transmissions as a result of the physics of the internal combustion engine. All internal combustion engines have a maximum engine rotational speed above which the internal combustion engine can not effectively operate due to limitations of various internal combustion engine components, such as the valvetrain or reciprocating components. Additionally, internal combustion engines have an engine speed range where horsepower and torque are at their maximum. The transmission, through changes in gear ratio, allows the ratio between the rotational speed of the engine and the drive wheels to change as the automobile accelerates or decelerates. By varying the gear ratios within the transmission, the internal combustion engine may operate below the maximum rotational speed and preferably near the engine speed range for best performance and/or fuel economy. The transmission provides a gear set operable to provide a reverse gear for backing the automobile. The transmission also provides a low gear, effective to allow adequate acceleration of the automobile while not sacrificing the top speed of the automobile.

Vehicular transmissions typically employ a clutch mechanism such as a hydraulically actuated plate-type clutch or a set of synchronizers in order to effect a gear selection. Engineers strive to make this gear selection as smooth and imperceptible to the driver as possible. Modern vehicular transmissions are designed with a very small footprint to allow tighter packaging within the engine bay resulting in an increased passenger cabin volume. Therefore, it is important to ensure that the usable space within the transmission housing is effectively utilized in the design of the transmission.

Automatically and manually shiftable transmissions constitute the two main varieties of vehicular transmissions. Automatically shiftable transmissions select the gear ratio with no input from the driver, whereas the manually shiftable transmissions require a gear selection input from the driver. Different gear selection techniques exist for manual transmissions such as, dual clutch shifting and synchronized shifting. The synchronized transmission designs utilize synchronizers to ensure that the drive gear rotational speed closely matches that of the input shaft during a shift to effect a smooth transition through the gear sets. The dual clutch transmission, or DCT, employs two separate input shafts, each with its own corresponding clutch, to engage and disengage the input shafts. In a 5-speed DCT, for instance, one input shaft would account for forward ranges 1, 3, and 5, and the second shaft would account for forward ranges 2 and 4 as well as a reverse range. Automatically shiftable transmissions typically employ hydraulically actuated plate-type clutches. Other variations of the automatic transmission may employ both hydraulically actuated plate-type clutches as well as one-way clutches. In this variation, the one-way clutches are used to improve shift feel and shift timing by enabling the smooth release of the off-going clutching element as the on-coming element gains torque capacity.

SUMMARY OF THE INVENTION

Provided is a shiftable vehicular transmission having a rotatable first input shaft and an output shaft. At least one drive gear is rotatably mounted with respect to the first input shaft, and at least one driven gear is fixedly mounted with respect to the output shaft and in constant mesh with the drive gear. Additionally, at least one selectively engageable slipper ring clutch is disposed between the drive gear and the first input shaft. The selectively engageable slipper ring clutch operates to lock the drive gear with the first input shaft when engaged so that the drive gear may rotate with substantially the same rotational speed as the first input shaft. Subsequently, the selectively engageable slipper ring clutch operates to unlock the drive gear from the first input shaft when disengaged so that the drive gear may rotate independently with respect to the first input shaft.

Also provided is a hybrid vehicular transmission having a plurality of electric motors and a plurality of planetary gear sets. A plurality of selectively engageable slipper ring clutches is also provided, each being operable to selectively couple at least one of the plurality of planetary gear sets with at least one of the plurality of electric motors when the slipper ring clutch is engaged. Additionally, the selectively engageable slipper ring clutch operates to de-couple the at least one the plurality of gear sets from the at least one of the plurality of electric motors when the slipper ring clutch is disengaged. The selectively engageable slipper ring clutch may be selectively engaged by a hydraulic actuator. Additionally, an input shaft mounted damper assembly operable to attenuate the transmission of torsional vibrations to the hybrid vehicular transmission may be provided. One of the plurality of selectively engageable slipper ring clutches may operate to bypass the damper assembly when engaged. Alternately, the selectively engageable slipper ring clutches are operable to allow the damper assembly to function when disengaged.

Also provided is an automatically shiftable transmission having a low forward range planetary gear system having a low gear and a selectively engageable slipper ring clutch operable to control the low forward range planetary gear system, thereby providing a measure of engine braking in the low gear.

The selectively engageable slipper ring clutch may include an inner slipper ring having an outer periphery and an outer slipper ring also having an inner periphery and an outer periphery each being circumferentially disposed about the inner slipper ring. The outer slipper ring has a slit operable to allow the radial expansion of the outer slipper ring. A plurality of arcs are formed on the outer periphery of the inner slipper ring, and the outer slipper ring has complementary number of arcs formed on the inner periphery. The plurality of arcs and complementary arcs form a plurality of cavities between the inner slipper ring and the outer slipper ring. A plurality of roller elements are disposed respectively within the plurality of cavities. An outer race is rotatably mounted with respect to the outer periphery of the outer slipper ring. At least one positionable selector sleeve may be provided to selectively engage and disengage the selectively engageable slipper ring clutch. Additionally, a bimetallic spring mechanism may be disposed between the inner periphery of the outer race and the outer periphery of the outer slipper ring. The bimetallic spring operates to transmit drag forces between the outer race and the outer slipper ring when the fluid within the selectively engageable slipper ring clutch is cold and to subsequently reduce the drag forces when the fluid within the selectively engageable slipper ring clutch is warmer.

By employing selectively engageable slipper ring clutch mechanisms within vehicular transmission combinations, many benefits may be garnered. These benefits may include, reduced part cost, smaller packaging footprint, lower torque loss, reduced control scheme complexity, increased power density, and the ability to shift gears in both a synchronous and non-synchronous state.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 3 is a schematic fragmentary sectional view of a Dual Clutch Transmission, or DCT, architecture employing input shaft mounted, selectively engageable slipper ring clutches;

FIG. 7a is a schematic lever diagram representing an automatically shiftable transmission operating in a first forward range and illustrating the combination of a slipper ring clutch within the automatically shiftable transmission operable to enable engine braking in first gear;

FIG. 7b is a schematic lever diagram representing the automatically shiftable transmission of FIG. 7a operating in a second forward range; and FIG. 7c is a schematic lever diagram representing the automatically shiftable transmission of FIG. 7a operating in the first forward range illustrating an engine braking condition.

DESCRIPTION OF THE PREFERRED EMBODIMENTS

Figure 1A:
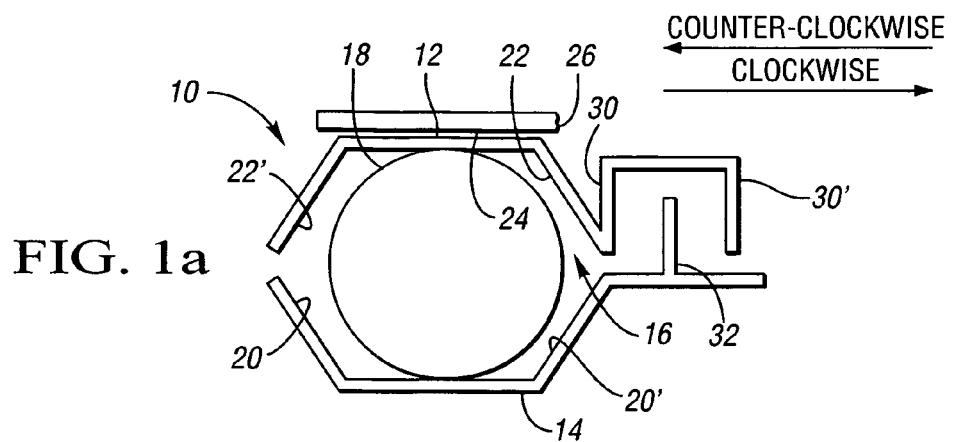
FIGS. 1a, 1b, 1c, and 1d taken together comprise a series of four schematic cross-sectional diagrams of a slipper ring clutch illustrating the four states of operation.

Referring to the figures wherein like reference numbers refer to like or similar components, FIGS. 1a, 1b, 1c, and 1d are schematic diagrams of a selectively engageable slipper ring clutch 10 each illustrating one of four states of engagement. The outer slipper ring 12 and the inner slipper ring 14 of the slipper ring clutch 10 define a cavity 16 with a roller element 18 disposed therein. The outer slipper ring 12 is of a split ring design, described hereinafter, allowing the outer slipper ring 12 to expand radially outward. FIG. 1a represents a state in which the slipper ring clutch 10 is locked or engaged in both rotational directions, clockwise and counter-clockwise. With clockwise rotation of the inner slipper ring 14, the roller element 18 will engage ramp 20 of the inner slipper ring 14. Subsequently, the roller element 18 will engage ramp 22 of the outer slipper ring 12. This engagement of ramp 22 will force the outer slipper ring 12 to expand outward and frictionally engage a generally cylindrical inner surface 24, also shown in FIG. 2, defined by an outer race 26, thereby locking the outer race 26 and the slipper ring clutch 10 together for unitary rotation. If the direction of rotation of the slipper ring clutch 10 is reversed, i.e. moving the inner slipper ring 14 in the counter-clockwise direction, the roller element 18 will engage ramp 20' of the inner slipper ring 14 and ramp 22' of the outer slipper ring 12. The roller element 18 will force the outer slipper ring 12 to expand radially outwardly to frictionally engage the cylindrical inner surface 24 of outer race 26 in the same fashion as previously described, thereby locking the outer race 26 and the slipper ring clutch 10 for unitary rotation.

Figure 1B:
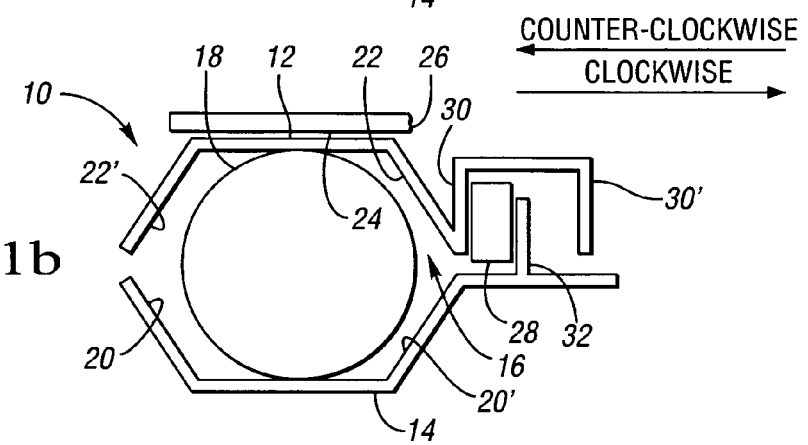

In FIG. 1b, a first key 28 is inserted between tab 30 of the outer slipper ring 12 and tab 32 of the inner slipper ring 14. The presence of the first key 28 will allow relative motion between the outer slipper ring 12 and the inner slipper ring 14 in the clockwise direction, thereby allowing the slipper ring clutch 10 to engage the outer race 26 in the way previously described. However, the presence of first key 28 will disallow relative motion between the inner slipper ring 14 and the outer slipper ring 12 in the counter-clockwise direction disallowing the expansion of the outer slipper ring 12. In effect, the slipper ring clutch 10 will "freewheel" in the counter-clockwise direction.

Figure 1C:
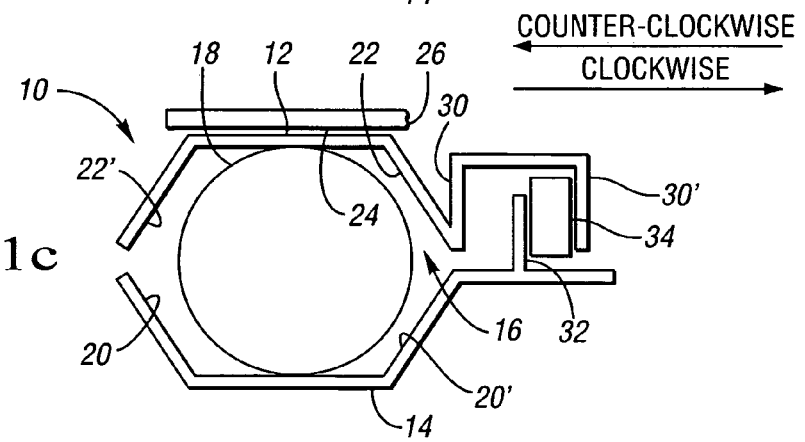

In FIG. 1c, a second key 34 is inserted between tab 30' of the outer slipper ring 12 and tab 32 of the inner slipper ring 14. The slipper ring clutch 10 will operate in the opposite fashion to that of FIG. 1b, in that it will "freewheel" in the clockwise direction and lock in the counter-clockwise direction.

Figure 1D:
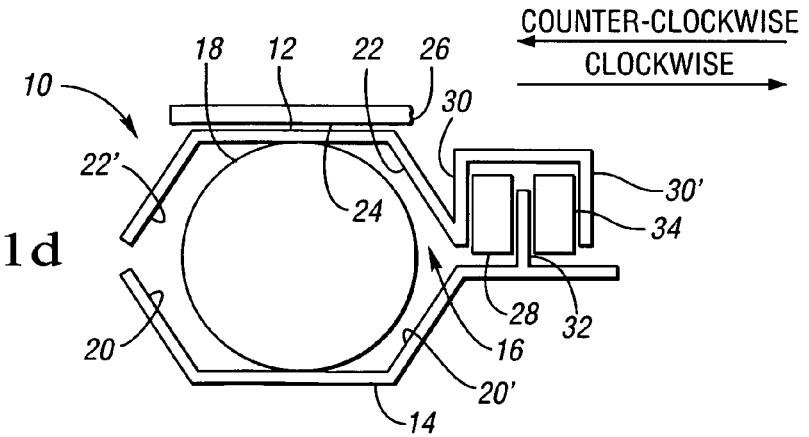

FIG. 1d illustrates a condition where the relative motion of the inner slipper ring 14 to that of the outer slipper ring 12 is restricted by the inclusion of both the first key 28 and the second key 34 within the slipper ring clutches 10. This will force the slipper ring clutch to "freewheel" in both the clockwise and counter-clockwise direction.

Figure 2:
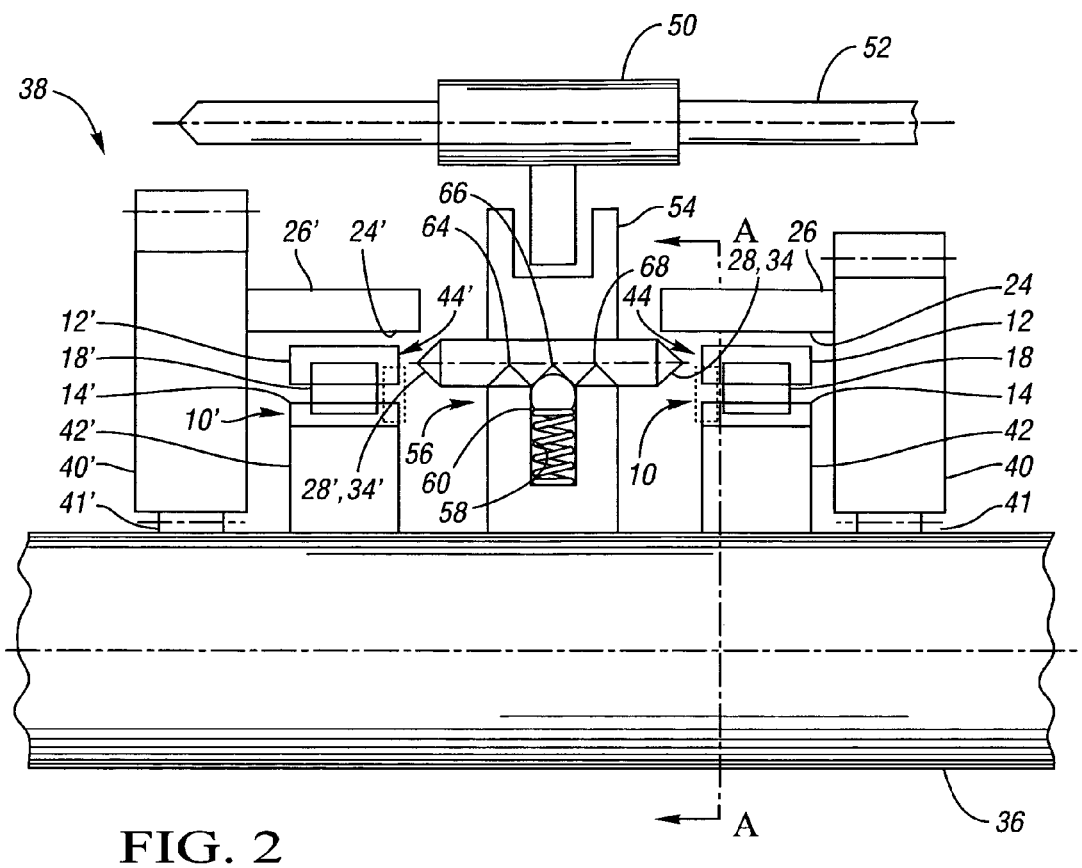
FIG. 2 is a schematic sectional fragmentary view of an exemplary manual transmission input shaft mounted slipper ring clutch mechanism, showing the portion of the slipper ring clutch mechanism above the centerline of the input shaft.
Figure 2A:
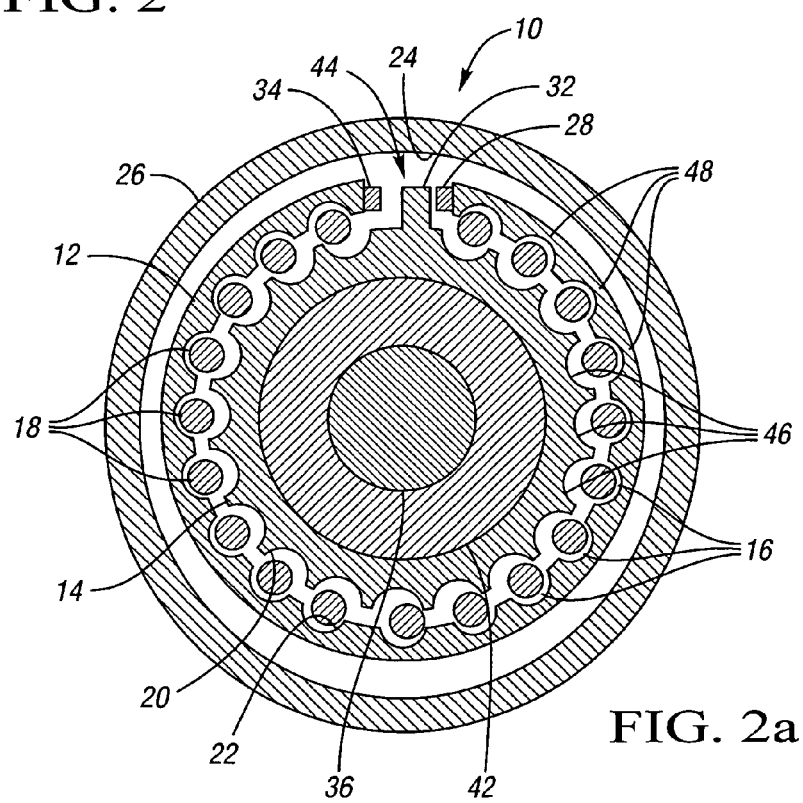
FIG. 2a is a schematic cross-sectional view, taken along line A-A of FIG. 2, of an exemplary slipper ring clutch design.

FIG. 2 is a schematic sectional fragmentary view of a transmission 38 illustrating an input shaft 36 mounted slipper ring clutches 10 and 10'. The slipper ring clutches 10 and 10' operate to substantially lock gears 40 and 40', respectively, to the input shaft 36 of the transmission, thereby providing the requested gear ratio. The gears 40 and 40' are rotatably mounted with respect to the input shaft 36 by bearings 41 and 41', respectively. The slipper ring clutch 10 has the ability to dissipate energy upon frictional engagement of the outer slipper ring 12 with the outer race 26. This attribute allows both synchronous and non-synchronous gear selections. Therefore, the relative rotational speed between the input shaft 36 to that of the gear 40 is of little consequence to provide smooth gear engagements. FIG. 2a is a schematic sectional view, taken along line A-A of FIG. 2, of a typical slipper ring clutch 10 illustrating the structure of the slipper ring clutch 10 whose operation was described with reference to FIG. 1. An inner race 42 is fixedly mounted, and coaxially oriented with respect to the input shaft 36. The inner slipper ring 14 is fixedly attached to, and coaxially oriented with the inner race 42. The inner race 42 and the inner slipper ring 14 may be separate elements or may be a single element. The outer slipper ring 12 is circumferentially disposed about the inner slipper ring 14. The outer slipper ring 12 has a split 44 to allow the radial expansion of the outer slipper ring 12. A plurality of arcs 46 are provided on the outside periphery of the inner slipper ring 14 and a plurality of arcs 48 are provided on the inside periphery of the outer slipper ring 12 to form a plurality of cavities 16 within each of which the generally cylindrical roller element 18 is disposed.

Referring back to FIG. 2, the outer race 26 is rigidly mounted with respect to the gear 40 and rotates coaxially about the slipper ring clutch 10. The cylindrical inner surface 24 of outer race 26 defines the surface upon which the outer slipper ring 12 will frictionally engage upon engagement of slipper ring clutch 10. This frictional engagement substantially locks the input shaft 36 to the gear 40, thereby providing the requested gear ratio. The selective engagement of the gears 40 and 40' may be performed by the translational movement of a shift fork 50 slidably mounted to a shaft 52. The shift fork 50 will engage a selector sleeve 54 having three axial positions relative to the slipper ring clutches 10 and 10'. These three axial positions are maintained by a detent mechanism 56. The detent mechanism 56 includes a spring 58 operable to bias a ball 60, which operates to engage recesses 64, 66, and 68 formed on the selector sleeve 54. First keys 28, 28' and second keys 34, 34' are fixedly mounted with respect to the selector sleeve 54 and are operable to selectively engage the split 44, shown in FIG. 2a, formed by the outer slipper ring 12.

By sliding the shift fork 50 to the right, the selector sleeve 54 will move to the left-most detent position 64 and will extract the first key 28' and the second key 34' from the split 44' allowing the outer slipper ring 12' to expand radially and frictionally engage the cylindrical inner surface 24' of the outer race 26'. The frictional engagement between the slipper ring clutch 10' and the outer race 26' will dissipate the energy generated by a non-synchronous shift and cause the gear 40' to become substantially locked to the input shaft 36 for unitary rotation therewith. The first key 28 and second key 34 will remain engaged with slipper ring clutch 10, forcing the slipper ring clutch 10 to "freewheel". Upon movement of the selector sleeve 54 to the middle detent position 66, as shown in FIG. 2, both first keys 28 and 28' and second keys 34 and 34' will remain engaged with both slipper ring clutches 10 and 10'. This condition will force both slipper ring clutches 10 and 10' to "freewheel" creating a neutral gear selection state. Moving the selector sleeve 54 to the right-most detent position 68 will extract first key 28 and second key 34 allowing the outer slipper ring 12 to expand and frictionally engage the cylindrical inner surface 24 of the outer race 26. This frictional engagement between the slipper ring clutch 10 and the outer race 26 will dissipate the energy generated by a non-synchronous shift and cause the gear set 40 to become substantially locked to the input shaft 36 for unitary rotation therewith. The first key 28' and second key 34' will remain engaged with slipper ring clutch 10', forcing the slipper ring clutch 10' to "freewheel".

FIG. 3 is a schematic sectional fragmentary view of a Dual Clutch Transmission or DCT 70 employing a plurality selectively engageable slipper ring clutches 10, 10" mounted with respect to the input shaft 36. Additionally, a plurality of selectively engageable slipper ring clutches 10', 10'" are mounted with respect to the input shaft 36'. The use of slipper ring clutches 10, 10', 10", and 10'" within the DCT 70 may simplify the control scheme of input clutches 72 and 72'. Slipper ring clutches 10 and 10" are fixedly mounted with respect to the input shaft 36 containing odd gear sets 76 and 76", while the slipper ring clutches 10' and 10'" are fixedly mounted with respect to the input shaft 36', which contains the even gear sets 76' and 76'".

The shifting operation of the DCT 70 is best understood by way of example. In first gear, slipper ring clutch 10 will be engaged; thereby locking the gear set 76 to the input shaft 36 to provide the requisite gear ratio to an output shaft 78. Additionally, to transfer torque from an engine 77 to the DCT 70, the input clutch 72 must also be engaged. The second slipper ring clutch 10' is operable to frictionally lock the gear set 76', corresponding to the second forward range, to the input shaft 36'. The slipper ring clutch 10' may engage the gear set 76' while the gear set 76 is engaged. However, the input clutch 72' must be de-clutched or disengaged during this pre-selection operation to avoid lockup of the DCT 70. Prior to the shift to the gear set 76', the slipper ring clutch 10 will remain engaged with the gear set 76, but will be set to a "freewheel" ready state. When the shift is desired, the input clutch 72' will engage and slipper ring clutch 10 will be set to "freewheel". The pre-selected gear set 76' will then provide the requisite gear ratio to the output shaft 78. With the slipper ring clutch 10 "freewheeling", the de-clutching of the input clutch 72 during the shift will not be required. This characteristic may reduce the control system complexity for the operation of the DCT 70. The shifting of the DCT 70 will cause little torque interruption and will therefore provide a smooth shift feel. Shifts from gear set 76' to gear set 76" to gear set 76'" as well as downshifts will follow a similar sequence.

Figure 4:
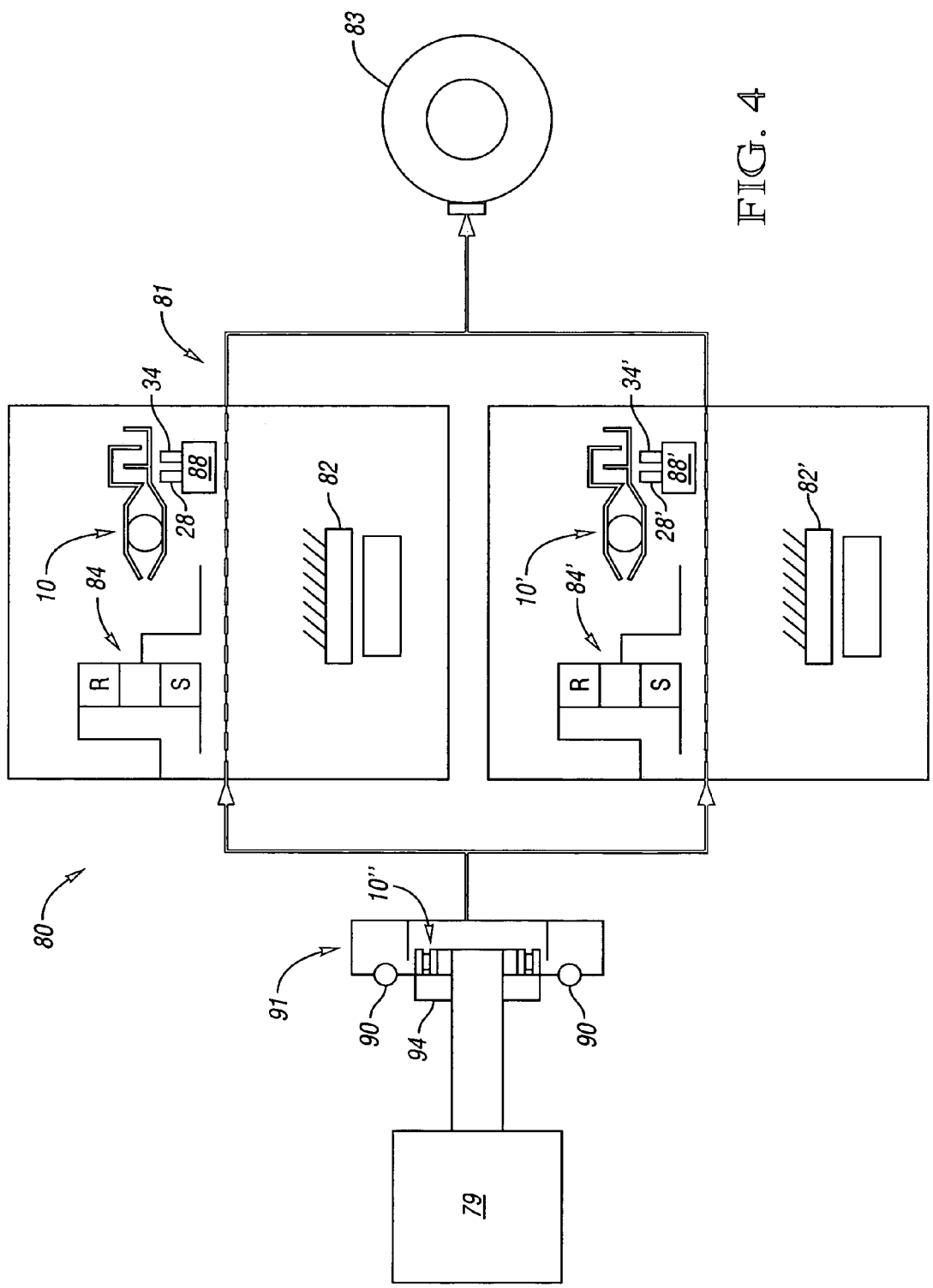
FIG. 4 is a schematic diagram illustrating the various components of a hybrid powertrain system employing a plurality of slipper ring clutches.

The slipper ring clutch 10 may also be used within hybrid powertrain applications. FIG. 4 is a schematic diagram illustrating the various components of a hybrid powertrain system 80 having an engine 79, hybrid transmission 81, and a final drive 83. The hybrid transmission 81 employs multiple slipper ring clutches 10 and 10' and favors the use of a plurality of motors 82 and 82' combined with a plurality of planetary gear sets 84 and 84' selectively engageable by slipper ring clutches 10 and 10'. The hybrid powertrain system 80 will enable multiple modes of operation with the possibility of higher system efficiency. The shifting from one mode of operation to another is synchronous due to the minimal slip speed experienced by the slipper ring clutches 10 and 10'. This configuration may also result in improved packaging and lower spin losses than traditional clutch mechanisms.

The slipper ring clutch 10 may be integrated within the hybrid transmission 81 in place of a traditional hydraulically actuated plate-type clutch. The slipper ring clutches 10 and 10' may use a hydraulic actuators 88 and 88', respectively to effect engagement. The actuators 88 and 88' are similar to the actuators employed for hydraulic plate-type clutch engagement. However, the hydraulic actuators 88 and 88' are operable to selectively engage the outer slipper ring with first keys 28, 28' and second keys 34, 34'. Therefore, for operating modes requiring the engagement of the slipper ring clutch 10, the hydraulic actuator 88 will be de-stroked. When the hydraulic actuator 88 is stroked, the slipper ring clutch 10 will "freewheel". The same principle of operation applies to the slipper ring clutch 10' and actuator 88'.

An additional slipper ring clutch 10" placement within the hybrid transmission 81 is shown in FIG. 4. The slipper ring clutch 10" may be used to bypass torsional springs 90 located within a damper 91 when starting or shutting down the internal combustion engine 79. In this embodiment, a hydraulic actuator 94 will engage and disengage the slipper ring clutch 10". The damper 91 operates to isolate the transmission from the torsional vibrations caused by the firing pulses of the engine 79. However, when shutting down or restarting the engine 79, such as when transitioning into an out of electric mode, the compliance of the damper 91 may impart a resonance to the hybrid transmission 81. Therefore, it is beneficial to bypass the springs 90 when shutting off and restarting the engine 79. The slipper ring clutch 10" located within the damper 91 may result in improved packaging and lower torque losses than traditional clutching mechanisms.

Figure 5:
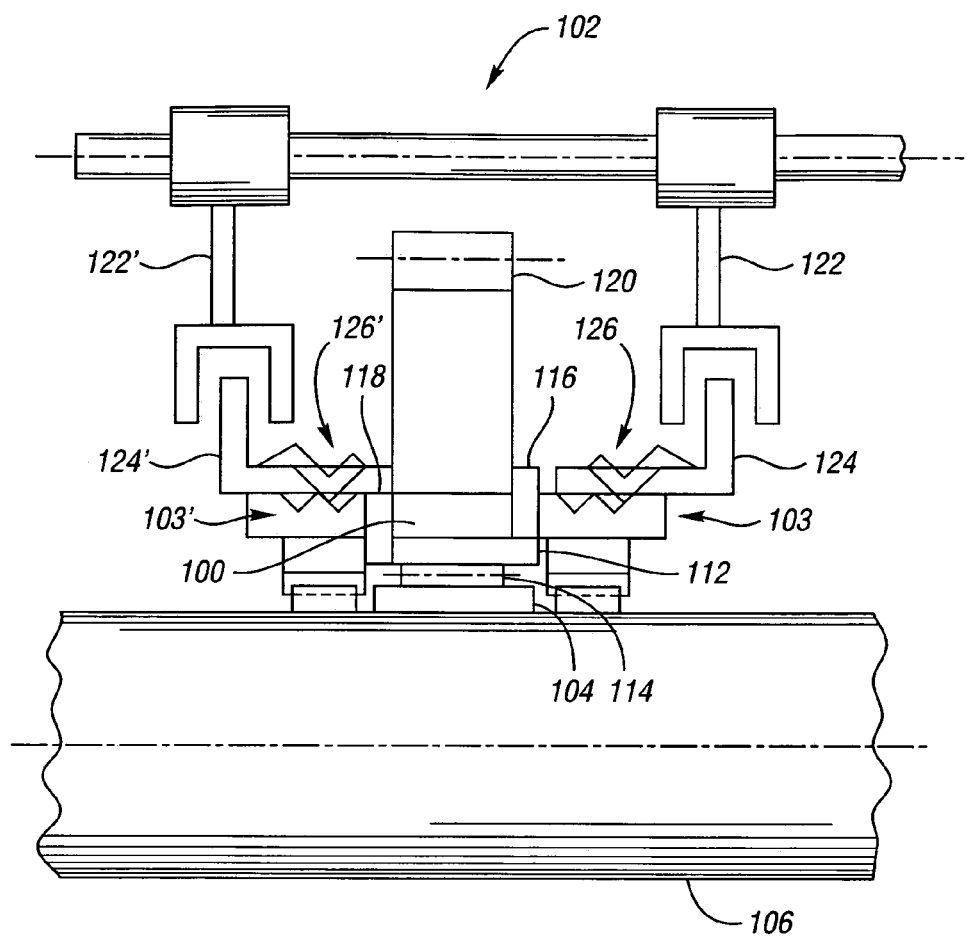
FIG. 5 is a schematic sectional fragmentary view of an alternate embodiment of a slipper ring clutch mechanism as used in an vehicular transmission showing the portion of the slipper ring clutch mechanism above the centerline of the input shaft and illustrating a simplified construction and an improved locking mechanism.
Figure 5A:
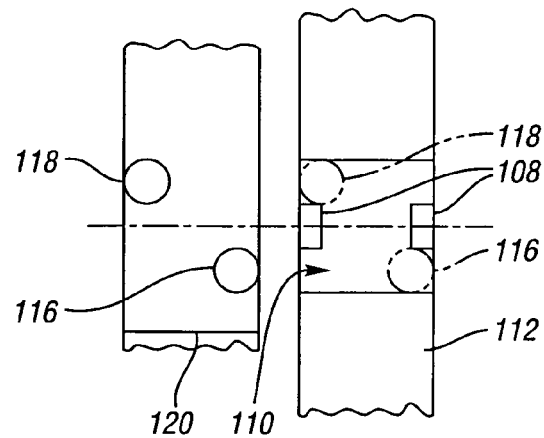
FIG. 5a is a schematic fragmentary view illustrating a mechanism for locking the slipper ring clutch of FIG. 5.

FIG. 5 is a schematic sectional fragmentary view of a design for a slipper ring clutch 100 as used in a transmission 102 and illustrating a simplified design and improved selective engagement mechanism 103. An inner slipper ring 104 is coaxially located and fixedly attached to the rotatable input shaft 106. By mounting the inner slipper ring 104 directly to the input shaft 106, the need for the inner race 42, as shown in FIG. 2, is obviated. The inner slipper ring 104 has at least one tab 108, shown in FIG. 5a, that extends upwardly into the space defined by slit 110, shown in FIG. 5a, formed in an outer slipper ring 112. The outer slipper ring 112 is coaxially disposed about the outer periphery of the inner slipper ring 104. A plurality of arcs, similar to reference number 20 of FIG. 2a, are formed on the outside periphery of the inner slipper ring 104 and a complimentary number of arcs, similar to reference number 22 of FIG. 2a, are formed on the inside diameter of the outer slipper ring 112. The plurality of arcs form a like number of cavities, similar to reference number 16 of FIG. 2a, within which a roller element 114 is disposed. Two spring-biased pins 116 and 118 are disposed within gear 120 and are operable to selectively engage and disengage the slipper ring clutch 100. The selective engagement is accomplished by the movement of fork 122 forcing the selection sleeve 124 to insert pin 116 into the space formed in the slit 110 by the tab 108 and the edge of the outer slipper ring 112, as shown in FIG. 5a. In this state of engagement, the slipper ring clutch 100 will be engaged in only one rotational direction, while "freewheeling" in the other. The slipper ring clutch 100 may be made to "freewheel" in both directions by the engagement of both selector sleeves 124 and 124'. This condition will force pins 116 and 118 into the space formed from slit 110 by the tabs 108 and the opposite faces of the outer slipper ring 112. Upon disengagement of both selector sleeves 124 and 124' and subsequent extraction of pins 116 and 118, the slipper ring clutch 100 will be engaged in both rotational directions.

The selector sleeves 124 and 124' may be made from stamped metal due to the light forces that act upon them. Additionally, a detent feature 126 may be provided to the selector sleeve 124 and the gear 120 to retain the selector sleeve 124 in the desired state. The selector sleeve 124 may be formed from one or two parts, and may be manipulated by one or two shift forks 122 and 122'. The various states of operation described with reference to FIG. 1 are possible with the present embodiment. This alternate embodiment may be utilized in any of the previously discussed transmission architectures. The detent mechanisms 126 and 126' may also include a spring mounted ball operable to engage recesses formed within the selector sleeves 124 and 124', similar to that shown in FIG. 2. This engagement will ensure that the desired mode of engagement of slipper ring clutch 100 is maintained.

Figure 6A:
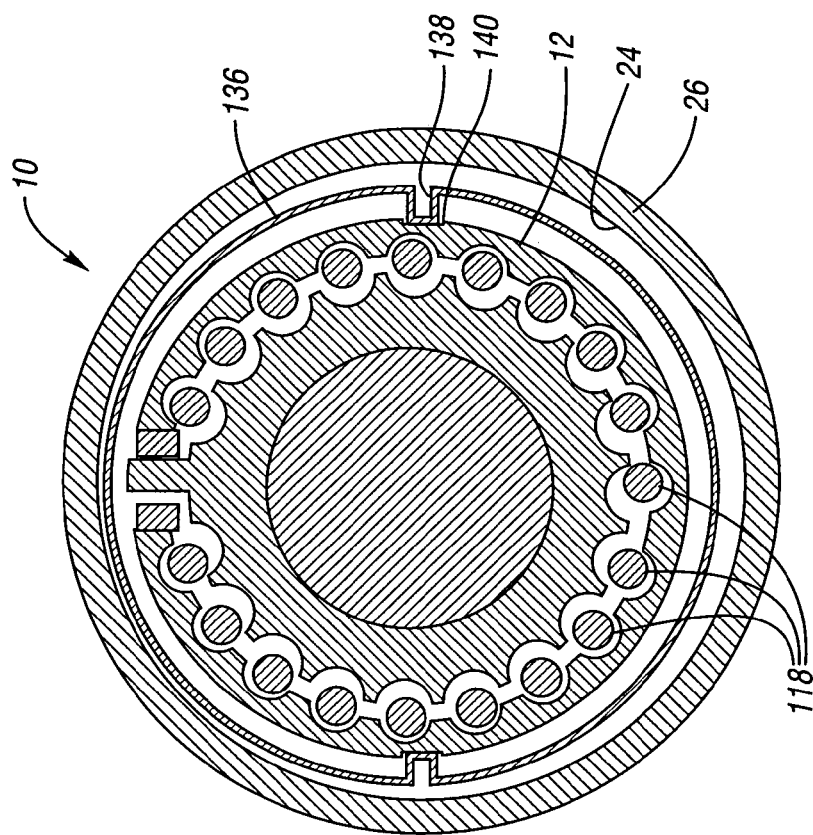
FIG. 6a is a schematic sectional view of a slipper ring clutch mechanism illustrating a bi-metallic drag spring device in a cold state of operation.
Figure 6B:
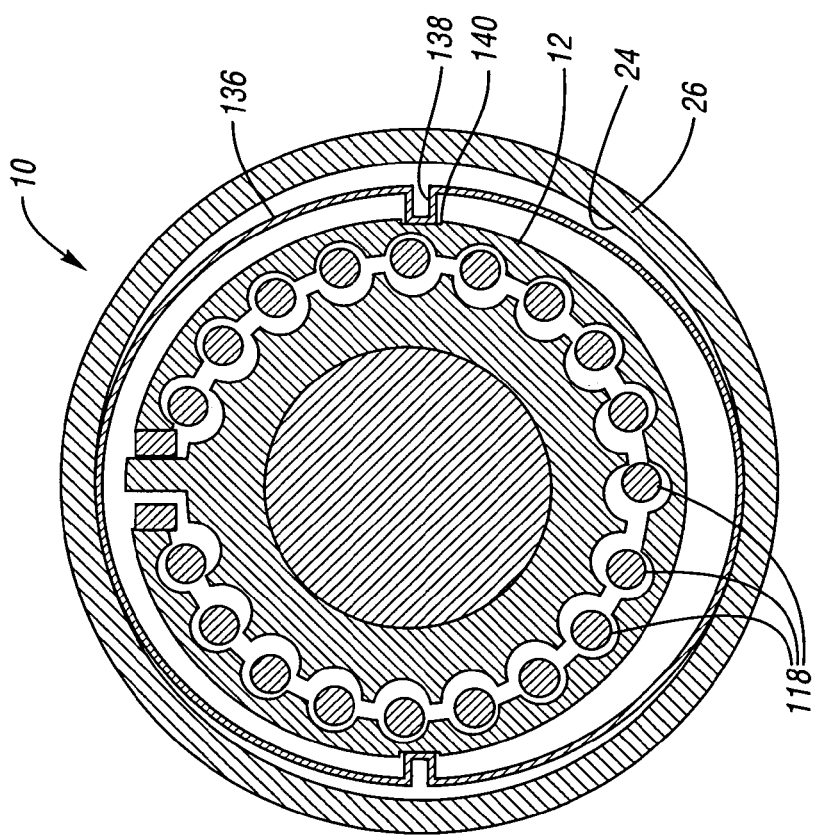
FIG. 6b is a schematic sectional view of a slipper ring clutch mechanism illustrating the bimetallic drag spring device shown in FIG. 6a in a warm state of operation.

FIGS. 6a and 6b are schematic diagrams of a slipper ring clutch 10 employing a bi-metallic spring 136 and illustrating two states of operation. Modern transmissions must operate in extreme conditions, such as temperature. Transmission fluid has a high viscosity, or resistance to flow, at low temperatures, which may cause a hydrodynamic film to develop at the interface between the outer slipper ring 12 and outer race 26. With the development of this film, there may be insufficient friction available to enable the roller element 18 to effectively expand the outer slipper ring 12 and frictionally engage the inner surface 24 of the outer race 26. An additional force may be required to shear the cold fluid form this interface. A solution may be to employ a drag producing device such as the bi-metallic spring 136. The bimetallic spring 136 will impart a drag force between the outer slipper ring 12 and the outer race 26 at low temperatures. The variance in thermal expansion coefficients between the two metals used in the bimetallic spring 136 will enable a change in shape at higher operating temperatures thereby reducing the drag as the fluid temperature increases and the viscosity of the transmission fluid decreases.

FIGS. 6a and 6b illustrate one possible design for a drag inducing bi-metallic spring 136. The bi-metallic spring 136 is disposed between the cylindrical inside surface 24 of the outer race 26 and the outside diameter of the outer slipper ring 12 and has at least one extension 138 projecting radially inward and engaging a groove 140 formed on the outside diameter of the outer slipper ring 12. At low temperatures, the differences in thermal expansion between the two metal layers constituting the bi-metallic spring 136 will force the bi-metallic spring 136 into an oblong or oval shape, as shown in FIG. 6a. This oblong shape will cause the bi-metallic spring 136 to exert a drag force by frictionally engaging the cylindrical inner surface 24 of the outer race 26. At higher temperatures, the drag forces within the slipper ring clutch 10 will decrease as the bi-metallic spring 136 returns to a nearly circular shape and disengages the outer race 26, as shown in FIG. 6b.

FIGS. 7a, 7b, and 7c are schematic diagrams illustrating the implementation of a slipper ring clutch 10 in place of the hydraulic plate-type clutch and a one-way clutch first forward range/reverse system of an automatically shiftable transmission. The slipper ring clutch 10 can provide a mode of engagement in which the system can be engaged in both the clockwise and counter-clockwise rotational directions. This attribute makes the slipper ring clutch 10 particularly useful to provide engine braking in the first forward range. Engine braking is a method of decelerating a vehicle using the work expended by the internal combustion engine during the compression cycles. Implementation of engine braking in combination with a conventional friction based brake system increases the lifespan of the conventional brake system by reducing wear and heat generation. The slipper ring clutch 10 in this embodiment may require less packaging space as well as reduced control complexity.

FIGS. 7a, 7b, and 7c show an automatically shiftable transmission 150 in lever diagram form as will be readily understood by those skilled in the art. More precisely, FIGS. 7a, 7b, and 7c show a series of lever diagrams representing the automatically shiftable transmission 150 during the first forward range of operation, the second forward range of operation, and the first forward range of operation with engine braking enabled, respectively. The lever diagrams of FIGS. 7a, 7b, and 7c each include a vertical line 152 having a first second, third, and fourth node A, B, C, and D, respectively, and a diagonal line 154. The vertical line 152 generally represents the automatically shiftable transmission 150 at rest, while the diagonal line 154 represents the dynamic state of the automatically shiftable transmission 150. The nodes A, B, C, and D, represent planetary gear members, which are known in the art.

Referring to FIG. 7a, a lever diagram representing the automatically shiftable transmission 150 operating in the first forward range is shown. The slipper ring clutch 10 engages such that the relative speed across the slipper ring clutch is zero, therefore the rotational speed at node C is zero. The engine, not shown, provides an input torque T1 such that the rotation speeds of nodes A and B are V1 and V2, respectively in the clockwise direction. Additionally, the rotational speed of node D is V3 in the counterclockwise direction. A torque T2 is provided by the slipper ring clutch to ensure that the rotational speed of node C remains zero. A torque T3 is provided to node B by the final drive, not shown, of the vehicle. The torque T3 is a reaction torque to the torques T1 and T2. The key 34 is inserted in the slipper ring clutch 10 to allow the slipper ring clutch 10 to freewheel in the direction opposite the torque T2.

Referring to FIG. 7b, a lever diagram representing the automatically shiftable transmission 150 operating in the second forward range is shown. In this mode of operation, the slipper ring clutch 10 is disengaged, while a reaction clutch 156 is engaged such that the rotational velocity of node D is zero. The engine, not shown, provides an input torque T4 such that the rotation speeds of nodes A, B, and C are V4, V5, and V6, respectively in the clockwise direction. A torque T5 is provided by the reaction clutch 156 to ensure that the rotational speed of node D remains zero. A torque T6 is provided to node B by the final drive, not shown, of the vehicle. The torque T6 is a reaction torque to the torques T4 and T5.

Referring now to FIG. 7c, a lever diagram representing the automatically shiftable transmission 150 operating in the first forward range engine braking condition is shown. The slipper ring clutch 10 engages such that the relative speed across the slipper ring clutch is zero, therefore the rotational speed at node C is zero. The final drive, not shown, in slowing the vehicle provides an input torque T1 such that the rotation speeds of nodes A and B are V7 and V8, respectively in the clockwise direction. Additionally, the reaction clutch 156 disengages to allow the node D to rotate with a rotational speed of V9 in the counterclockwise direction. A torque T9 is provided by the slipper ring clutch to ensure that the rotational speed of node C remains zero. A torque T8 is provided to node A by the engine, not shown, of the vehicle. The torques T8 and T9 are the reaction torques to the torque T7. The key 34 is removed from the slipper ring clutch 10 to allow the slipper ring clutch 10 to lock or engage in both directions. By operating the slipper ring clutch engaged in both directions the torque T8 may be transferred to the engine, and the corresponding resistance to the transfer of torque T8 by the engines compressive forces, a measure of engine braking is provided.

While the best modes for carrying out the invention have been described in detail, those familiar with the art to which this invention relates will recognize various alternative designs and embodiments for practicing the invention within the scope of the appended claims.

The invention claimed is:

1. A shiftable vehicular transmission comprising:
   a rotatable first input shaft;
   an output shaft;
   at least one drive gear rotatably mounted with respect to said first input shaft;
   at least one driven gear fixedly mounted with respect to said output shaft and in constant mesh with said at least one drive gear;
   at least one selectively engageable slipper ring clutch disposed between said at least one drive gear and said first input shaft and operable to lock said at least one drive gear with said first input shaft when engaged so that said at least one drive gear may rotate with substantially the same rotational speed as said first input shaft, and to subsequently unlock said at least one drive gear from said first input shaft when disengaged so that said at least one drive gear may rotate independently with respect to said first input shaft;
   wherein said first input shaft has a first input clutch, and further comprising a rotatable second input shaft having a second input clutch.

2. A shiftable vehicular transmission comprising:
   a rotatable first input shaft;
   an output shaft;
   at least one drive gear rotatably mounted with respect to said first input shaft;
   at least one driven gear fixedly mounted with respect to said output shaft and in constant mesh with said at least one drive gear;
   at least one selectively engageable slipper ring clutch disposed between said at least one drive gear and said first input shaft and operable to lock said at least one drive gear with said first input shaft when engaged so that said at least one drive gear may rotate with substantially the same rotational speed as said first input shaft, and to subsequently unlock said at least one drive gear from said first input shaft when disengaged so that said at least one drive gear may rotate independently with respect to said first input shaft;
   wherein said at least one selectively engageable slipper ring clutch includes:
      an inner slipper ring having an outer periphery and being coaxially located and fixedly attached to said at least one input shaft for unitary rotation therewith;
      an outer slipper ring having an inner periphery and an outer periphery each being circumferentially disposed about said inner slipper ring and having a slit operable to allow radial expansion of said outer slipper ring;
      a plurality of arcs formed on said outer periphery of said inner slipper ring, said outer slipper ring having complementary arcs formed on said inner periphery, said plurality of arcs and complementary arcs forming a plurality of cavities between said inner slipper ring and said outer slipper ring;
      a plurality of roller elements disposed respectively within said plurality of cavities;
      an outer race mounted with respect to said at least one drive gear and rotatable with respect to said outer periphery of said outer slipper ring; and
      at least one positionable selector sleeve operable to selectively engage and disengage said at least one selectively engageable slipper ring clutch.

3. The shiftable vehicular transmission of claim 2, further comprising a detent mechanism operable to maintain a desired position of said selector sleeve.

4. The shiftable vehicular transmission of claim 3, wherein said detent mechanism includes a spring biased ball.

5. The shiftable vehicular transmission of claim 2, wherein the selector sleeve is stamped from sheet metal.

6. The shiftable vehicular transmission of claim 2, further comprising:
   at least one spring loaded locking pin contained within said at least one drive gear, said at least one drive gear being coaxially rotatable about said slipper ring clutch, said at least one locking pin being operable to cause said slipper ring clutch to freewheel when engaged; and
   at least one shift fork operable to move said selector sleeve.

7. A shiftable vehicular transmission comprising:

a rotatable first input shaft;

an output shaft;

at least one drive gear rotatably mounted with respect to said first input shaft;

at least one driven gear fixedly mounted with respect to said output shaft and in constant mesh with said at least one drive gear;

at least one selectively engageable slipper ring clutch disposed between said at least one drive gear and said first input shaft and operable to lock said at least one drive gear with said first input shaft when engaged so that said at least one drive gear may rotate with substantially the same rotational speed as said first input shaft, and to subsequently unlock said at least one drive gear from said first input shaft when disengaged so that said at least one drive gear may rotate independently with respect to said first input shaft wherein said at least one selectively engageable slipper ring clutch includes:

an inner slipper ring;

an outer race having an inner periphery;

an outer slipper ring having an outer periphery and circumferentially disposed about said inner slipper ring and operable to engage said outer race; and a bi-metallic spring mechanism disposed between said inner periphery of said outer race and said outer periphery of said outer slipper ring and operable to transmit drag forces between said outer race and said outer slipper ring when the fluid within said selectively engageable slipper ring clutch is cold and to subsequently reduce said drag forces when the fluid within said selectively engageable slipper ring clutch is warmer.

* * * * *